(12) United States Patent
Lakshmanan et al.

(10) Patent No.: US 6,878,356 B2
(45) Date of Patent: Apr. 12, 2005

(54) RECOVERY OF ZINC FROM GALVANIZED COATINGS

(75) Inventors: Vaikuntam Iyer Lakshmanan, Mississauga (CA); Ramamritham Sridhar, Mississauga (CA); Mohamed Shafiqul Alam, Toronto (CA)

(73) Assignee: Process Research Management Inc., Oakville (CA)

( * ) Notice: Subject to any disclaimer, the term of this patent is extended or adjusted under 35 U.S.C. 154(b) by 333 days.

(21) Appl. No.: 10/142,993

(22) Filed: May 13, 2002

(65) Prior Publication Data

US 2003/0012716 A1 Jan. 16, 2003

(51) Int. Cl.$^7$ ................................................ C01G 9/00
(52) U.S. Cl. ........................ 423/99; 423/101; 423/102; 423/105
(58) Field of Search .................... 423/99, 101, 102, 423/105; 205/605

(56) References Cited

U.S. PATENT DOCUMENTS

| | | | | |
|---|---|---|---|---|
| 3,971,843 A | * | 7/1976 | Helgorsky et al. | .......... 423/112 |
| 5,277,883 A | * | 1/1994 | Turcotte et al. | ............. 423/112 |
| 6,077,486 A | * | 6/2000 | Spitzer | ....................... 423/121 |

* cited by examiner

*Primary Examiner*—Steven Bos
(74) *Attorney, Agent, or Firm*—Sim & McBurney

(57) ABSTRACT

A method for extraction of zinc values from an aqueous alkaline solution of zinc, especially a solution obtained by the stripping of a galvanized coating from a ferrous metal product e.g. steel, or from electric arc furnace dust. The method comprises subjecting the aqueous alkaline solution to solvent extraction using an organic solution of an oxine i.e. an organic extractant containing an 8-hydroxyquinoline group, and separating the organic solution from aqueous alkaline solution. Zinc values are recovered from the organic solution e.g. by stripping with acid and subjecting the resultant aqueous solution containing zinc values for recovery of zinc e.g. to electrowinning or to precipitation of zinc carbonate. The method may be used in the preparation of galvanized steel for recycle to a steel manufacturing plant, with recovery of zinc and for recovery of zinc values from electric arc furnace dust.

17 Claims, 2 Drawing Sheets

RECOVERY OF ZINC FROM GALVANIZED COATINGS

FIELD OF THE INVENTION

The method of the present invention relates to the recovery of zinc values from aqueous alkaline solutions containing the zinc values, and especially to the recovery of zinc values from such aqueous alkaline solutions that have been obtained from secondary materials. For instance, the zinc values may be obtained by stripping of galvanized coatings from ferrous metal products, from electric arc furnace dust, and from other sources. In embodiments in which the zinc values are obtained from galvanized coatings on ferrous metal products, the ferrous metal product is steel, especially steel that is being recycled and is to be used as a feedstock in a steel manufacturing plant.

BACKGROUND TO THE INVENTION

Ferrous metal products, including steel, undergo corrosion in the presence of moisture, for example when exposed to air or water. It is, therefore, common practice to apply a protective coating to the ferrous metal product for protection against atmospheric corrosion. Various protective coatings may be used to prevent contact between the ferrous metal product and the atmosphere, and thus to prevent or reduce corrosion. In some instances, the protective coatings are sacrificial coatings i.e. coatings that are intended to preferentially react with moisture, and thereby protect the ferrous metal product.

A common coating on ferrous metal products is a galvanized coating, and such coatings are used on a wide variety of ferrous metal products, including steel products. Scrap galvanized coatings may contain a number of elements in addition to zinc, examples of which include aluminum, iron and silicon. Examples of methods of application include coating the ferrous metal product by passing the product through a bath of molten zinc and by electrodeposition of zinc. Passing the ferrous metal product through molten zinc tends to form an intermetallic compound at the interface and relatively pure zinc at the surface.

Part of the feedstock in the manufacture of steel is often scrap ferrous metal products. Such products are a low cost source of feedstock. However, if the scrap ferrous metal product has a galvanized coating, the high temperatures used in the manufacture of steel cause the zinc in the galvanized coating to be volatilized. The volatilized zinc is normally collected, especially in the form of a dust that is frequently referred to as electric arc furnace (EAC) dust. Electric arc furnace dust may also contain a number of elements in addition to zinc, examples of which include iron, lead, cadmium and chromium. Over time, there tends to an accumulation of zinc in the steel manufacturing process. Consequently, there is a tendency for the zinc content of the steel to increase. This causes difficulty in the manufacture of steel that meets product and quality control specifications, especially for the content of zinc as a trace metal, and ultimately to the manufacture of steel with unacceptable properties.

The galvanized coating on ferrous metal products may be removed (stripped) by treatment with caustic solutions e.g. solutions of potassium or sodium hydroxide. Such treatment results in the formation of potassium or sodium zincate, and an aqueous alkaline solution containing the zinc values. Although such stripping of the coating from galvanized ferrous metal products allows the stripped metal product to be used as feedstock in the manufacture of steel, the consequence is an aqueous alkaline solution of zinc values that must be treated or otherwise be disposed of in an environmentally friendly manner.

SUMMARY OF THE INVENTION

A method has now been found for the recovery of zinc values from an aqueous alkaline solution of zinc.

Accordingly, one aspect of the present invention provides a method for extraction of zinc values from an aqueous alkaline solution of zinc, comprising:

(a) subjecting the aqueous alkaline solution to solvent extraction using an organic solution of an extractant containing an oxine group; and (b) separating organic solution from aqueous alkaline solution, said organic solution containing zinc values.

In a preferred embodiment, the aqueous alkaline solution is a solution of sodium or potassium hydroxide, and in particular the zinc values are in the form of sodium or potassium zincate.

In another preferred embodiment, the extractant containing an oxine group is selected from the group consisting of 8-hydroxy quinoline and substituted 8-hydroxy quinoline, especially in which the substituted 8-hydroxy quinoline is alkyl or alkylene-substituted 8-hydroxy quinoline.

In further embodiments, the zinc values have been obtained from a galvanized coating or from electric arc furnace dust.

In another embodiment, the organic solution obtained in step (b) is subjected to a scrubbing step to remove metal values other than zinc values.

In further embodiments, organic solution containing zinc values is acidified, and an aqueous acidic solution containing zinc values is separated therefrom. In particular, the solution is acidified with sulphuric acid or hydrochloric acid.

In another embodiment, organic solution separated from the aqueous acidic solution is recycled to step (a).

In further embodiments, zinc values are recovered from the aqueous acidic solution e.g. by electrowinning or by precipitation of a zinc compound from the aqueous acidic solution. Precipitation may be effected by addition of an alkali metal carbonate or bicarbonate to the aqueous acidic solution, especially in which the alkali metal carbonate or bicarbonate is sodium carbonate. Zinc carbonate may be precipitated and recovered, optionally with aqueous solution from the separation of zinc carbonate being recycled to the step for precipitation of a zinc compound from the aqueous acidic solution.

In embodiments, the aqueous alkaline solution subject to solvent extraction in step (a) is obtained by stripping of galvanized ferrous metal with alkaline solution, or from electric arc furnace dust.

BRIEF DESCRIPTION OF THE DRAWINGS

The present invention is illustrated by the embodiment shown in the drawings, in which.

DETAILED DESCRIPTION OF THE INVENTION

The method of the present invention relates to the recovery of zinc values from an aqueous alkaline solution containing zinc. In particular embodiments, the method relates to the extraction of zinc values from the aqueous alkaline solution using an organic extractant that contains an oxine group. Examples of such organic extractants include 8-hydroxy quinoline and substituted 8-hydroxy quinolines, in organic solution. Organic extractants containing oxine groups, which may be generally referred to herein as oxines, are available commercially, for instance under the trade mark Kelex™. In other embodiments, the method of the present invention relates to the stripping of galvanized coatings from ferrous metal products, especially steel, followed by treatment with an organic extractant containing an oxine group in organic solution to separate zinc values, and the subsequent recovery of zinc. In further embodiments, the present invention relates to recovery of zinc values from electric arc furnace dust using organic extractants containing oxine groups.

Zinc may be recovered by a variety of techniques, for instance as zinc metal by electrowinning or by recovery as zinc carbonate. The various solutions used in the process are capable of being recycled, with make-up solutions being added and/or part of the recycled being bled as necessary to maintain the concentration of reactant of acceptable quality.

Figure 1:
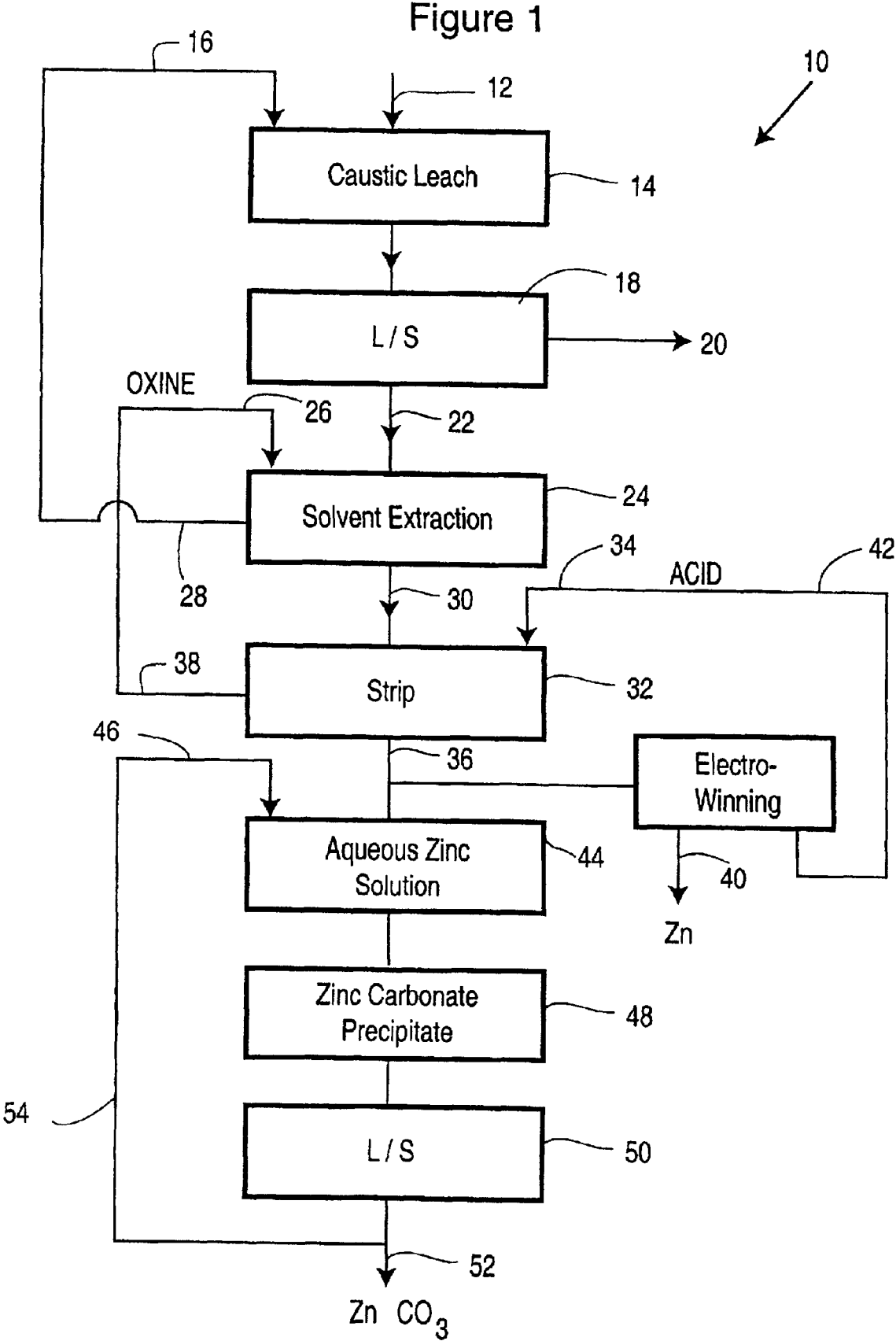
FIG. 1 is a schematic representation of a process of the present invention for treatment of galvanized steel and recovery of zinc values.

FIG. 1 shows a schematic representation of an embodiment of the method of the present invention, generally indicated by 10, in which zinc values are recovered from scrap galvanized steel. In method 10, scrap galvanized steel 12 is fed to caustic leach tank 14. An alkaline solution 16, which is preferably a caustic solution e.g. potassium hydroxide or more especially sodium hydroxide, is also fed to caustic leach tank 14. Alkaline solution 16 may be fresh caustic solution, but as discussed below and shown in FIG. 1, alkaline solution 16 is preferably a recycled solution, with make-up added or bleeding as required.

In caustic leach tank 14, the galvanized coating is stripped from the galvanized scrap steel 12 fed to the tank. The galvanized coating passes into solution, to form an aqueous alkaline solution containing zinc values. These zinc values would normally be in the form of a zincate e.g. sodium zincate. The resultant stripped steel and aqueous alkaline solution are then subjected to liquid/solid separation step 18. Solid material 20, which is stripped steel and which may be referred to as black scrap, is separated and typically would be sent to a steel mill as a feedstock.

Aqueous alkaline solution 22 separated in liquid/solid separation step 18 is fed to solvent extraction step 24. A solution of an organic extractant containing an oxine group (oxine) 26 is also fed to solvent extraction step 24. One example of such an organic extractant is 8-hydroxy quinoline. The organic extractant may also be a substituted 8-hydroxy quinoline, examples of which include alkyl and alkenyl substituted 8-hydroxy quinoline. Examples of substituted 8-hydroxy quinolines include 7-(4-ethyl-1-methyloctyl)-8-hydroxy quinoline and 7-tetrapropylenyl-8-hydroxy quinoline. The solution of oxine 26 fed to solvent extraction step 24 is in the form of oxine in organic diluent e.g. a hydrocarbon, examples of which are kerosene and the hydrocarbons available as Isopar 'M' and Norpar 13. It is understood that the organic diluent would need to be capable of dissolving oxine 26 and of forming a two-phase solution in solvent extraction step 24. The solution of oxine 26 may also contain modifiers, for example higher alcohols, an example of which is iso-decanol and which is available as EXXAL 13.

In solvent extraction step 24, the zinc values are extracted from the aqueous alkaline solution into the organic solution, forming a complex with oxine. An aqueous alkaline raffinate solution essentially free of zinc, 28, is separated in the solvent extraction step. Raffinate solution 28 would normally be recycled, with make-up or bleeding as required, and used as alkaline solution 16 for caustic leach tank 14. As discussed above, a portion of raffinate solution 28 may be bled off to maintain acceptable quality in alkaline solution 16.

Organic solution 30 is subjected to stripping with acid, as described below. However, as an optional intermediate step prior to stripping, organic solution may be subjected to a scrubbing step. For instance, if the organic solution contained cadmium, organic solution 30 could be scrubbed for removal of cadmium prior to stripping for recover of zinc values.

The organic solution, 30, from solvent extraction step 24 or from any scrubbing step, is fed to stripping step 32. Acid solution 34 is also fed to stripping step 32. Acid solution 34 is typically a solution of sulphuric acid, although other acid solutions may be used e.g. hydrochloric acid, as well as combinations of such acids and alkali metal salts thereof e.g. combinations of sulphuric acid and sodium sulphate. Stripping step 32 effects stripping of zinc values from organic solution 30, to form an aqueous acidic solution of zinc values, 36. The oxine remains in the stripped organic solution 38. Stripped organic solution 38 is preferably recycled as oxine solution 26, with make-up and bleeding as required.

Acidic zinc solution 36 from stripping step 32 is subjected to steps for recovery of zinc. A variety of techniques may be used for the recovery of zinc.

As one example, acidic zinc solution 36 may be subjected to electrowinning, especially if the acid used is sulphuric acid. Electrowinning provides zinc metal, 40 and a spent acidic solution 42 that may be recycled to stripping step 32 as acid solution 34, again with make-up and bleeding as required.

Alternatively, acidic zinc solution 36 may be subjected to steps to recover zinc by precipitation techniques. For example, acidic zinc solution 36 may be fed to aqueous zinc solution tank 44 and mixed with carbonate solution 46. Carbonate solution 46 may be an alkali metal carbonate or bicarbonate, mostly typically sodium carbonate, especially soda ash. Carbonate solution 46 neutralizes the acid in acidic zinc solution 36, and then forms zinc carbonate precipitate 48. Zinc carbonate precipitate 48, which is a precipitate in solution, is subjected to liquid/solid separation step 50. Solid zinc carbonate 52 is separated. The remaining aqueous solution viz. aqueous solution 54, contains excess carbonate e.g. sodium carbonate, and is preferably recycled, with make-up and bleeding as required, as carbonate solution 46.

While the method of FIG. 1 has been particularly described with respect to galvanized steel, the method may also be applied to electric arc furnace dust and other materials containing zinc values.

Figure 2:
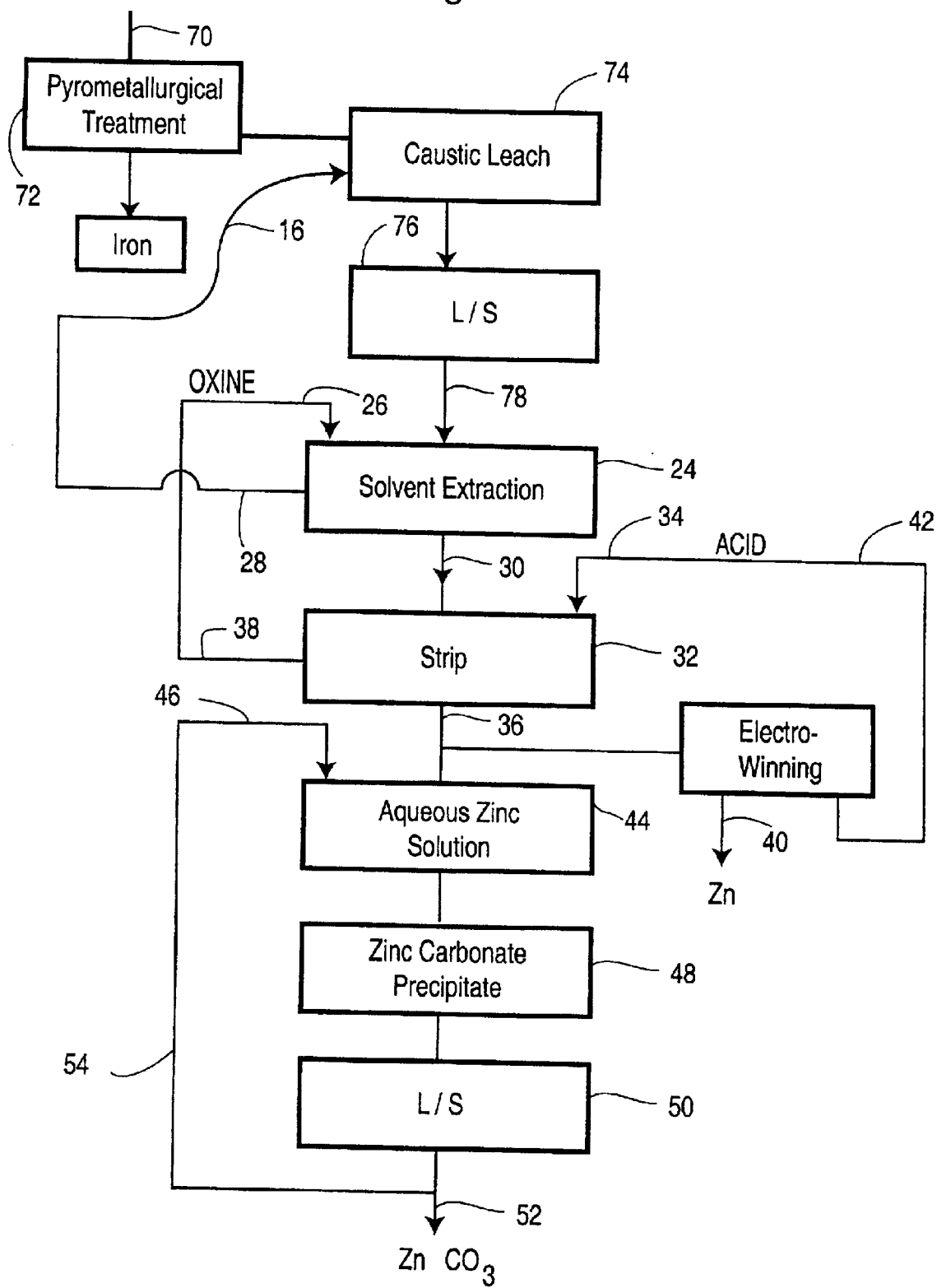
FIG. 2 is a schematic representation of an alternate embodiment of the process of the present invention.

FIG. 2 shows an alternate embodiment of the process of the present invention. In this embodiment, electric arc furnace dust or other zinc coated e.g. galvanized coated, product, especially steel, is fed to a pyrometallurgical treatment step 72. Examples of pyrometallurgical treatment steps include use of a plasma furnace, cupola furnace and electric arc or induction furnaces. Iron products are then separated from zinc product, which is in the form of an impure zinc product. The impure zinc product is fed to a caustic leach step 74, as described above. After leaching, the resultant mixture is subjected to a liquid/solid separation step 76, and the liquid phase is subjected to steps to recover zinc, for example as described above with respect to FIG. 1.

The method of the present invention provides for separation of zinc values from aqueous alkaline solutions of zinc values, especially zinc values obtained from galvanized coatings. In embodiments, the method provides for stripping of galvanized coatings from ferrous metal products, especially steel, for the separation of zinc values therefrom and for recovery of zinc e.g. as zinc metal or as a precipitate. The method may be operated with recycle of all solutions that are used. Moreover, the method is environmentally friendly, and does not utilize solutions that are hazardous.

The present invention is illustrated by the following examples.

EXAMPLE I

An industrial leach solution of sodium zincate was subjected to solvent extraction using an organic extractant containing an oxine group viz. Kelex™ 100 oxine derivative (CMAB-oxine, 7-(4-ethyl-1-methyloctyl)-8-hydroxy quinoline) from Witco Corporation. Norpar™ 13 aliphatic kerosene solvent was used, with EXXAL™ 13 alcohol (iso-decanol) as phase separator.

The extraction tests were carried out using an organic feed of 5% by volume of Kelex 100 oxine derivative and 5% by volume of EXXAL 13 alcohol in Norpar 13 solvent. The aqueous feed was sodium zincate solution containing 38.678 g/L of zinc. The phase ratio of organic to aqueous solutions (O/A) and temperature were varied.

The aqueous and organic solutions were shaken together for 5 minutes at the various temperatures. After phase separation, the aqueous phase was analyzed for zinc. Percentage extraction of zinc was calculated using the formula $$\% \ E = \frac{[Zn]_f - [Zn]_{aq}}{[Zn]_f} \times 100$$

where E is extraction, $Zn_f$ is zinc feed and $Zn_{aq}$ is the aqueous phase.

The results obtained are given in Table I.

TABLE I

| Run # | Temperature | Phase Ratio (O/A) | $[Zn]_f$ (g/L) | $[Zn]_{aq}$ (g/L) | % Extraction of Zn |
|---|---|---|---|---|---|
| 1 | Room Temp. | 1 | 38.678 | 34.833 | 9.94 |
| 2 | Room Temp. | 2 | 38.678 | 32.013 | 17.23 |
| 3 | Room Temp. | 5 | 38.678 | 27.323 | 29.36 |
| 4 | Room Temp. | 0.5 | 38.678 | 36.541 | 5.52 |
| 5 | 40° C. | 1 | 38.678 | 36.008 | 6.90 |
| 6 | 40° C. | 2 | 38.678 | 31.997 | 17.27 |
| 7 | 40° C. | 5 | 38.678 | 25.559 | 34.0 |
| 8 | 40° C. | 0.5 | 38.678 | 36.252 | 6.27 |

The results show that 34% of the zinc was extracted at 40° C. using an O/A ratio of 5.

The zinc may be stripped from the organic phase using sulphuric acid solution.

EXAMPLE II

The procedure of Example I was repeated. The organic extractant was LIX 26 viz. 7-tetrapropylenyl-8-hydroxy quinoline, from Henkel Corporation.

Extraction tests were carried out at 40° C. and at different organic/aqueous (O/A) phase ratios. The organic feed was 25% vol % of LIX 26 and 5 vol % EXXAL 13 alcohol in NORPAR 13 solvent. The aqueous feed was sodium zincate solution.

The organic and aqueous solutions were seen together for 5–10 minutes at 40° C. After separation, the aqueous phase was analyzed for zinc, which was calculated as in Example I.

The results obtained are given in Table II.

TABLE II

| Run # | Phase Ratio (O/A) | $[Zn]_f$ (g/L) | $[Zn]_{aq}$ (g/L) | $[Zn]_{org}$ (g/L) | % Extraction of Zn |
|---|---|---|---|---|---|
| 9 | 4:1 | 43.306 | 1.75 | 10.39 | 95.96 |
| 10 | 2:1 | 43.306 | 16.77 | 13.27 | 61.28 |
| 11 | 1:1 | 43.306 | 28.86 | 14.45 | 33.36 |
| 12 | 1:2 | 43.306 | 34.70 | 17.21 | 19.87 |
| 13 | 1:4 | 43.306 | 40.50 | 11.22 | 6.48 |

A sample of the organic phase of Run 12 was sequentially stripped with 0.05M $H_2SO_4$ (pH=1). This organic feed had 17.21 g/L of zinc in LIX 26. The strippings were carried out at room temperature.

The results obtained are given in Table III:

TABLE III

| Run # | Phase Ratio (O/A) | $[Zn]_{stp}$ (g/L) | $[Zn]_{org}$ (g/L) | % Stripping of Zn (Total) |
|---|---|---|---|---|
| 14 (Strip-1) | 3:1 | 0.002 | 17.21 | 0 |
| 15 (Strip-2) | 3:1 | 2.17 | 16.49 | 4.18 |
| 16 (Strip-3) | 3:1 | 7.09 | 14.13 | 17.90 |
| 17 (Strip-4) | 3:1 | 7.90 | 11.50 | 33.18 |
| 18 (Strip-5) | 3:1 | 7.64 | 5.09 | 70.42 |

In Table III, $Zn_{stp}$ is the amount of zinc stripped out in each of the sulphuric acid solutions and $Zn_{org}$ is the amount of zinc remaining in the organic solution.

The results show that 70% of the zinc was stripped out in the five sequential stripping runs.

A sample of the organic phase of Run 12 was also sequentially stripped with aqueous sodium hydroxide solution (pH=11) at room temperature.

The results obtained are given in Table IV:

TABLE IV

| Run # | Phase Ratio (O/A) | $[Zn]_{stp}$ (g/L) | $[Zn]_{org}$ (g/L) | % Stripping of Zn (Total) |
|---|---|---|---|---|
| 19 (Strip-1) | 1:1 | 0.025 | 17.185 | 0.15 |
| 20 (Strip-2) | 1:1 | 0.006 | 17.18 | 0.17 |
| 21 (Strip-3) | 1:1 | 0.003 | 17.176 | 0.20 |

The example shows that sulphuric acid is effective in stripping zinc volumes from the organic phase, but that sodium hydroxide solution is ineffective in stripping zinc from the organic phase.

EXAMPLE III

The procedure of Example II was repeated using Kelex 100 i.e. the extractant of Example I, instead of LIX 26 extractant. The organic feed was 25 vol % Kelex 100 in NORPAR 13. The temperature was 40° C.

The results obtained are given in Table V:

TABLE V

| Run # | Phase Ratio (O/A) | $[Zn]_f$ (g/L) | $[Zn]_{aq}$ (g/L) | $[Zn]_{org}$ (g/L) | % Extraction of Zn |
|---|---|---|---|---|---|
| 22 | 2:1 | 43.306 | 15.66 | 13.823 | 63.84 |
| 23 | 1:1 | 43.306 | 32.54 | 10.77 | 24.86 |
| 24 | 1:2 | 43.306 | 35.62 | 15.37 | 17.75 |
| 25 | 1:3 | 43.306 | 39.95 | 10.07 | 7.75 |

The organic phase of Run 22, which contained 13.823 g/L of zinc, was sequentially stripped with 0.05M $H_2SO_4$.

The results obtained are given in Table VI:

TABLE VI

| Run # | Phase Ratio (O/A) | $[Zn]_{strp}$ (g/L) | $[Zn]_{org}$ (g/L) | % Stripping of Zn |
|---|---|---|---|---|
| 26 (Strip 1) | 1:1 | 0.19 | 13.63 | 1.4 |
| 27 (Strip 2) | 1:1 | 6.95 | 6.68 | 51.68 |
| 28 (Strip 3) | 1:1 | 8.11 | 0.00 | 100 |

The third stripping with the sulphuric acid solution resulted in 100% stripped of the zinc from the organic phase.

What is claimed is:

1. A method for extraction of zinc values in the form of sodium zincate or potassium zincate from an aqueous alkaline solution of zinc, wherein the aqueous alkaline solution is a solution of sodium hydroxide or potassium hydroxide, comprising:
   (a) subjecting the aqueous alkaline solution to solvent extraction using an organic solution of an extractant containing an oxine group;
   (b) separating organic solution from aqueous alkaline solution, said organic solution containing zinc values; and
   (c) contacting the organic solution containing zinc values with an aqueous acidic solution to form an aqueous acidic solution containing zinc values, said aqueous acidic solution being separated from the organic solution.

2. The method of claim 1 in which the extractant containing an oxine group is selected from the group consisting of 8-hydroxy quinoline and substituted 8-hydroxy quinoline.

3. The method of claim 2 in which the substituted 8-hydroxy quinoline is alkyl or alkylene-substituted 8-hydroxy quinoline.

4. The method of claim 1 in which the zinc values have been obtained from a galvanized coating or from electric arc furnace dust.

5. The method of claim 4 in which the organic solution obtained in (b) is subjected to a scrubbing step to remove metal values other than zinc values.

6. The method of claim 1 in which the acid of said aqueous acid solution is sulphuric acid or hydrochloric acid.

7. The method of claim 1 in which organic solution separated from the aqueous acidic solution is recycled to (a).

8. The method of claim 6 in which zinc values are recovered from the aqueous acidic solution.

9. The method of claim 8 in which zinc values are recovered by electrowinning.

10. The method of claim 8 in which zinc values are recovered by precipitation of a zinc compound from the aqueous acidic solution.

11. The method of claim 10 in which the precipitation is effected by addition of an alkali metal carbonate or an alkali metal bicarbonate to the aqueous acidic solution.

12. The method of claim 11 in which the alkali metal carbonate or the alkali metal bicarbonate is sodium carbonate.

13. The method of claim 10 in which the zinc compound precipitated from the aqueous acidic solution is zinc carbonate.

14. The method of claim 12 in which solid zinc carbonate is separated from the aqueous solution.

15. The method of claim 14 in which aqueous solution from the separation of zinc carbonate is recycled to the precipitation of a zinc compound from the aqueous acidic solution.

16. The method of claim 1 in which the aqueous alkaline solution subject to solvent extraction in step (a) is obtained by stripping of galvanized ferrous metal with alkaline solution.

17. The method of claim 1 in which the zinc values have been obtained from electric arc furnace dust.

* * * * *